United States Patent [19]

Tepic

[11] Patent Number: 5,093,050
[45] Date of Patent: Mar. 3, 1992

[54] METHOD FOR PRODUCING ORIENTED, DISCONTINUOUS FIBER REINFORCED COMPOSITE MATERIALS

[75] Inventor: Slobodan Tepic, Davos, Switzerland

[73] Assignee: Laboratorium für experimentelle Chirurgie, Davos, Switzerland

[21] Appl. No.: 437,683

[22] Filed: Nov. 17, 1989

[51] Int. Cl.$^5$ .................. B06B 1/10; B29C 35/02
[52] U.S. Cl. .................. 264/23; 156/73.2; 204/157.15; 204/157.42; 264/45.3; 264/69; 264/108; 264/204; 264/257; 264/311; 264/343; 425/174.2
[58] Field of Search ............. 264/22, 23, 24, 69, 264/70, 108, 45.3, 321, DIG. 58, 310, 311, 204, 257, 343; 425/174, 174.2; 156/73.1, 73.2; 204/157.15, 157.42, 157.62, 180.1

[56] References Cited

U.S. PATENT DOCUMENTS

| | | | |
|---|---|---|---|
| 3,010,158 | 11/1961 | Broderson | 264/108 |
| 3,066,355 | 12/1962 | Schloemann et al. | 264/DIG. 58 |
| 3,098,401 | 7/1963 | Breeze, Jr. et al. | 264/24 |
| 3,365,351 | 1/1968 | Maaz et al. | 264/310 |
| 3,668,096 | 6/1972 | Cook | 162/192 |
| 4,057,610 | 11/1977 | Goettler et al. | 264/108 |
| 4,102,831 | 7/1978 | Osgood | 264/108 |
| 4,288,398 | 9/1981 | Lemelson | 425/174.2 |
| 4,473,665 | 9/1984 | Martini-Vvedensky et al. | 264/45.3 |
| 4,500,280 | 2/1985 | Astier et al. | 425/174.2 |
| 4,793,954 | 12/1988 | Lee et al. | 264/108 |
| 4,948,480 | 8/1990 | Christy, Jr. et al. | 204/180.1 |

FOREIGN PATENT DOCUMENTS

| | | | |
|---|---|---|---|
| 2715747 | 10/1977 | Fed. Rep. of Germany | 264/23 |
| 84475 | 12/1971 | German Democratic Rep. | 425/174.2 |
| 136809 | 8/1979 | German Democratic Rep. | 264/23 |
| 61-149319 | 7/1986 | Japan | 264/23 |
| 2108897 | 5/1983 | United Kingdom | 264/108 |

Primary Examiner—Jeffery Thurlow
Assistant Examiner—Mathieu Vargot
Attorney, Agent, or Firm—Walter C. Farley

[57] ABSTRACT

A novel method for generating orientation of short fibers in the matrix of a composite material allows for production of complex high strength components. With state of the art technologies short fibers can be oriented only by elongational flows and these are generally applicable only to extrusion products. The invention is based on the fundamental discovery that short fibers can be oriented by relative movement against a finer three-dimensional isotropic network. Gel networks are of molecular level and satisfy this scaling requirement even for whiskers. The process involves mixing-in the fibers with a gel, pouring (injecting) the mixture into a mold and then orienting the fibers by moving them relative to the gel network. The movement can be driven by sound waves. When orientation is accomplished, the gel is solidified forming the matrix of the composite.

20 Claims, 4 Drawing Sheets

METHOD FOR PRODUCING ORIENTED, DISCONTINUOUS FIBER REINFORCED COMPOSITE MATERIALS

BACKGROUND OF THE INVENTION

This invention relates to a method for producing a composite material with oriented, reinforcing, discontinuous fibers.

The use of composite materials has been rapidly expanding in modern production technologies. With the costs of composite materials and production technologies dropping further these materials are expected to break out of the aerospace into automotive and industrial markets. There are three basic state of the art technologies for production of high strength composites:

1. The product is sequentially laminated using prefabricated woven fabric from high strength fibers and a suitable resin to impregnate and bind together the layers. This technique is used mostly to produce shell-shaped products (boat hulls, car bodies, airplane wings and fuselage, etc.). Different high strength fibers (glass, carbon, aramids) are available in many different patterns of woven fabric. Sequential layering is labor intensive. It is difficult to optimally use the reinforcing material since the fiber orientation within the product is constrained by the use of prefabricated patterns and the layering technique.

2. Direct incorporation of high strength fibers into the product. This technique works best for profiles where relatively simple machines can lay down the fibers in the required patterns. It is also commonly used for products of simple shape and function, such as pressure vessels. For complex parts this technique is very expensive.

3. Forming the products from discontinuous fiber (chopped) reinforced resins. This technique is most versatile, but chopped fiber cannot be optimally oriented and this sets a rather low limit on the strength of the composite. Orientation of the chopped fiber is possible with elongational flows, but this is generally limited to extrusion products.

SUMMARY OF THE INVENTION

The invention as claimed solves the problem of orienting the discontinuous (chopped) fibers in composite materials extending thus the usefulness of the simple technology (described above as state of the art technology example 3) into the application field of advanced high strength composites.

The invention is based on the fundamental discovery that short fibers can be oriented by relative movement against a finer, three-dimensional, isotropic network which typically is present in materials being in the physical state of a gel.

The requirements for the gel-like properties of the matrix will become clear with the detailed description of the invention. To this effect, a working definition of the term "gel" as used in connection with the present invention is cited below. "Gels are colloidal systems which have a dispersed component and a dispersion medium, both of which extend continuously throughout the system, and which have time-independent or equilibrium elastic properties; i.e. they will support a static shear stress without undergoing permanent deformation or flow. The dispersed component must be a three-dimensional network held together by junction points whose lifetimes are essentially infinite. These junction points may be formed by primary valence bonds, long-range attractive forces, or secondary valence bonds that cause association between segments of polymer chains or cause formation of submicroscopic crystalline regions", the "American Institute of Physics Handbook, 2nd ed., pages 2-82".

The requirement for "essentially infinite lifetimes" of the junction points for the material to be considered a true gel is not needed for the matrix according to the invention, and a wider class of materials can be used. For example, an entangled three-dimensional network of polymer chains in concentrated solutions may not have an equilibrium shear stiffness (i.e. it will undergo a permanent deformation under shear stress as the chains disentangle), but its gel-like time-dependent properties will suffice to make the orientation of the fiber possible. Also, a dispersion of entangled polymer chains in the monomer liquid at a given stage of monomer-to-polymer conversion will have gel-like properties suitable for the orientation of the reinforcing fiber.

A further class of materials suitable for the matrix are so-called thixotropic substances. These are gels in which under critical stress the network junction points will rupture and gels will convert to sols isothermally. When agitation is discontinued the junctions will re-establish.

Yet another class of suitable gel-like substances are xerogels. They can swell with suitable solvents to form a gel. Such are for example vulcanized or cross-linked rubbers, gelatin and agar.

In the further description of the invention the term "gel" or "gel-like" will be used to describe the substance for the matrix of the composite having a network structure dispersed in a dispersing medium, wherein this network structure is elastic. The network elasticity may be time-dependent. Lifetime of the network junctions need to be (at least) comparable to the time constant characterising the fiber movement through the network dispersing medium.

The fiber must be relatively stiff and of the length equal to at least a few times the average opening of the network. A forced movement of the fiber through this network very efficiently (for displacements of only a few lengths of the fiber) orients it in the direction of the movement. In contrast, movement of such a fiber through the fluid results in the fiber orienting itself at a right angle (90 degrees) to the direction of the movement. The orientation forces are also much higher in the case of the fiber movement through the gel where they depend on the network stiffness/strength.

The theory and mathematics of networks, as well as examples for the preparation of hydrogels (water-swollen polymeric networks) have been extensively described in the Journal of Biomedical Materials Research, Vol. 23, 1183-1193 (1989) by T. Canal and N.A.Pappas.

The advantages offered by the invention are mainly its ease of application and the low cost involved.

The various features of novelty which characterize the invention are pointed out with particularity in the claims annexed to and forming part of this disclosure. For the better understanding of the invention, its operating advantages and specific objects attained by its use, reference should be had to the accompanying drawings and descriptive matter in which are illustrated and described preferred embodiments of the invention.

DESCRIPTION OF THE PREFERRED EMBODIMENTS

Figure 1:
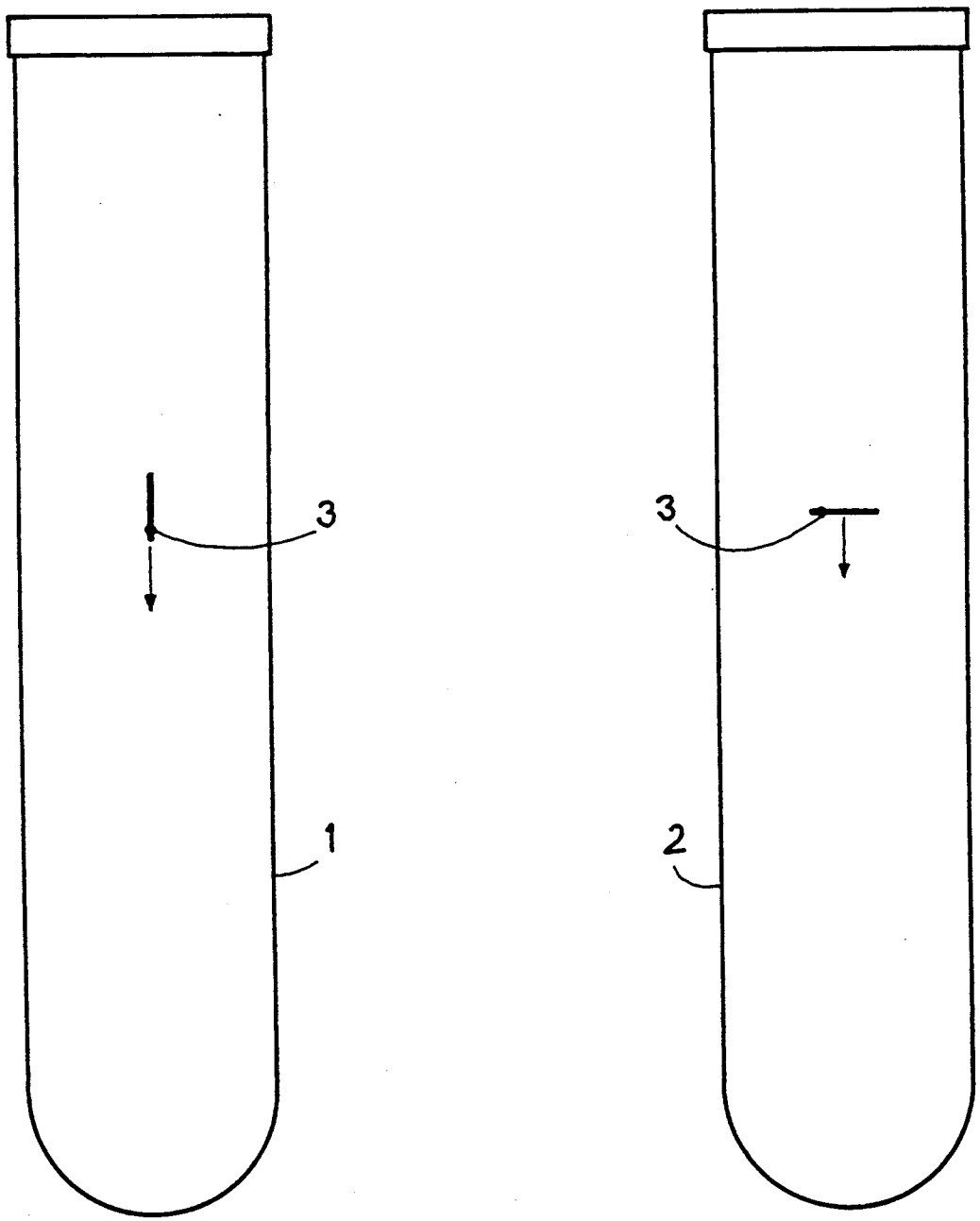
FIG. 1 is a schematic representation of a comparative experiment demonstrating the basic principle of the invention.

A simple demonstration of the basic principle of the invention is illustrated in FIG. 1.

A 1% gelatine sol is prepared by dissolving gelatine in water at about 70° C. and poured into a large test tube 1 (at left) with a volume of about 600 ml. Another tube 2 (at right) of equal volume is filled with glycerine. A small piece of stainless steel straight wire 3 (0.6 mm diameter, about 15 mm long) is thrown in each tube 1,2 and the tops are sealed off with no air left in the tubes 1,2. At room temperature the gelatine sol in the tube 1 at left will gel in about 48 hours. The tubes 1,2 are then repeatedly turned upside down and the movement of the wires 3 observed as they descend through the tubes 1,2 driven by their own weight. In both cases the speed of descent is approximately the same, but orientation of the wires 3 is different as represented in FIG. 1. The weight of the wire 3 is a weak driving force and therefore a very soft gel network is required to allow the wire to move through the gel.

Figure 2:
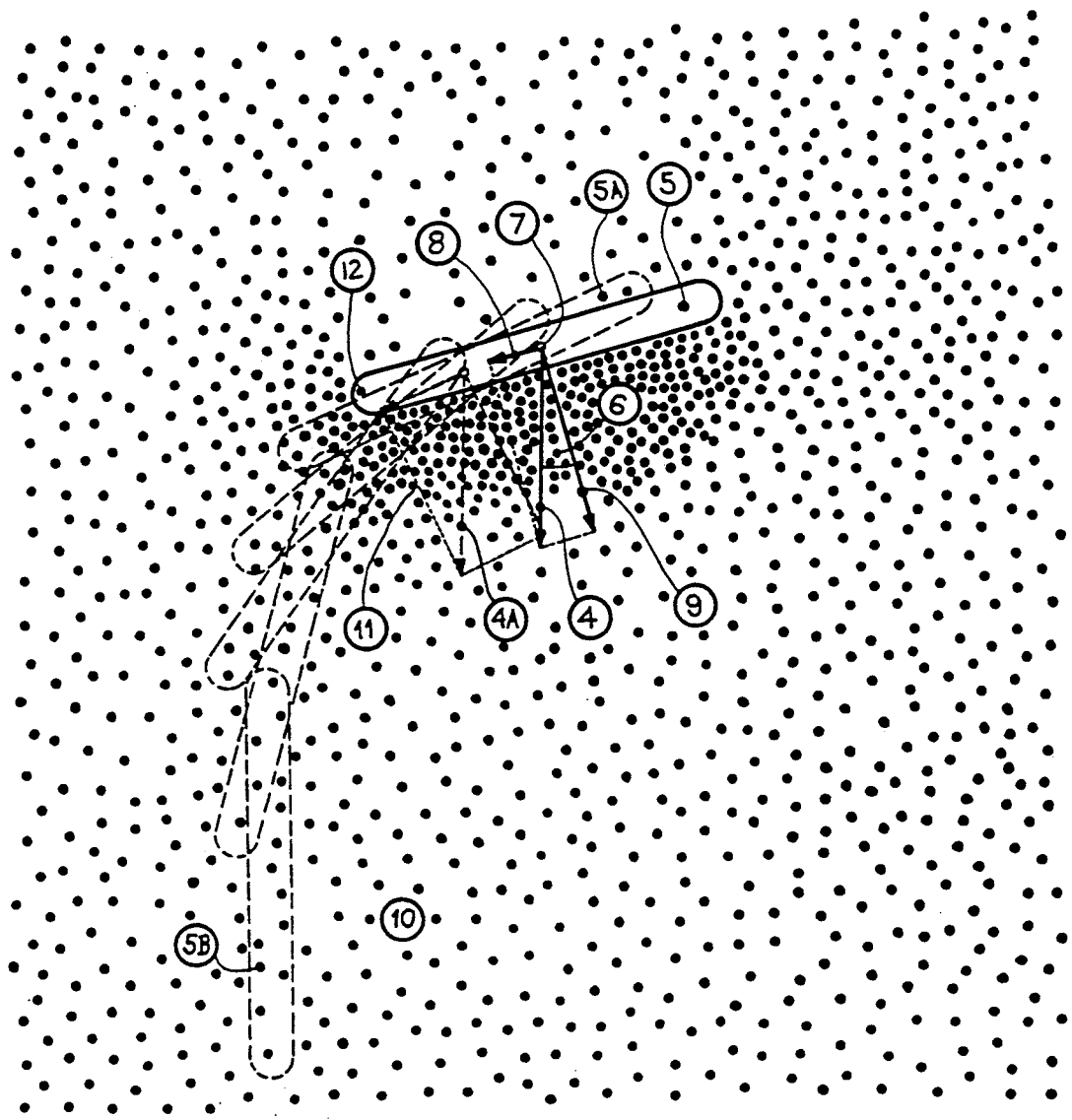
FIG. 2 is a schematic representation of the fiber movement through the gel and the forces acting on it.

FIG. 2 shows the forces acting on and the resulting movement of the fiber through the gel. Force 4 acts on the fiber 5 and defines an angle 6 with the normal to the fiber. Force 4 is the resultant driving force; if it is due to gravity or acceleration it will act at the center of gravity (c.g.) 7 of the fiber 5. The components of the force 4 in the direction of and normal to the fiber 5 are denoted by numerals 8 and 9 respectively. Normal component 9 will generate elastic deformation of the gel network 10 represented here with dots (network nodes). Stresses in the network will balance the force 9. Axial force 8 will also stress the network up to the point of piercing it. If the force 8 exceeds the piercing force (which can be thought of as the frictional force between the fiber 5 and the network 10) the fiber will start to move through the network 10. Its movement will also be resisted by the viscous drag against the fluid (dispersing) component of the gel. As the fiber 5 advances out of the region 11 of the elastically stressed network the forces acting on the fiber 5 will not be balanced any more; the tip 12 of the fiber 5 entering the unstressed network will not be subjected to normal stresses developed in response to force 9. This will result in dipping of the tip 12 and the fiber 5 will change orientation as shown by its new position 5A. This will continue until the fiber orients in the direction of movement as shown by position 5B. Relative movement between the fibers and the gel network is induced by the difference in the specific weight of the fibers and that of the gel-like matrix.

It is clear from the mechanism described above that the crucial property of the gel network 10 is its elastic response. True equilibrium stiffness of the network is not required however. A sufficiently entangled network will exhibit stiffness of long enough duration to allow for above described mechanism to function.

Figure 3:
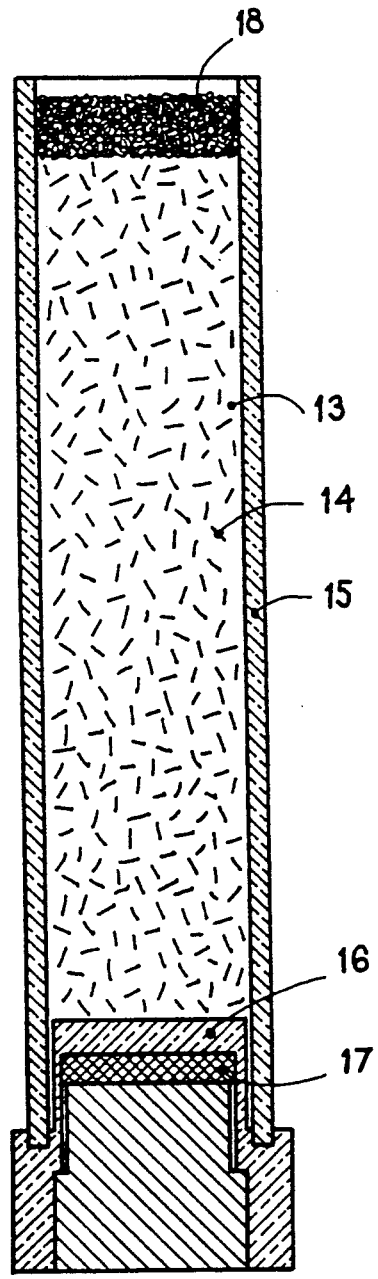
FIG. 3 is a schematic representation of an apparatus for carrying out the method according to the invention (before insonification)
Figure 4:
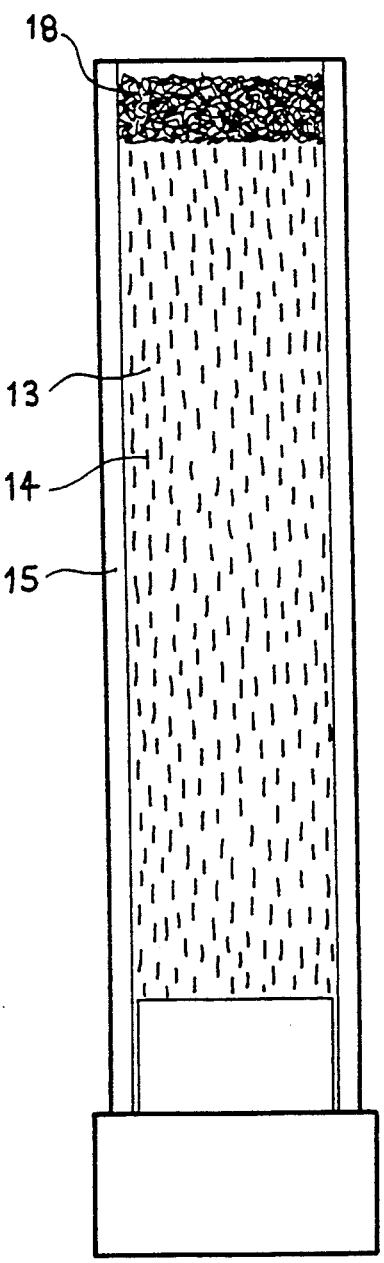
FIG. 4 is a schematic representation of an apparatus for carrying out the method according to the invention (after insonification)

It is possible to increase the force required for the driving of the fibers through the gel by the application of vibrational energy, in particular by sound waves (10 Hz to 20 MHz), as shown in FIGS. 3 and 4.

The frequency and the amplitude of the sound waves has to be chosen according to the type of components (fibers, gel, dimension and shape of the composite structure) used in the production of the composite and should be high enough (typically in the region of 20 kHz to 1 MHz) to drive the network and the fluid of the gel 13 together. The fibrils 14 suspended in the gel 13 will experience a slip against the fluid and the gel network as the wave passes (inertia of the fiber does not allow the fiber to follow displacements of the surrounding gel). If the slip is larger than the average opening of the network, even sinusoidal (symmetric) waves will orient the fiber by alternatively "threading" the network over the fiber ends. However, sawtooth shaped (asymmetric) waves will result in the net movement of the fiber (since the frictional forces between the fiber and the gel are a function of the slip speed) and orient it more efficiently. Total displacement of only a few fiber lengths will orient the fiber. Sound waves of low ultrasonic frequencies are appropriate for this purpose and are easily generated by piezoceramic transducers. For each product to be made the wave propagation must be established by practical trials and the appropriate transducers placed into the molds containing the fiber/gel mixture to be treated.

FIG. 3 shows a simple apparatus for carrying out the method according to the invention to generate axial orientation in a fiber reinforced rod. The bottom 16 of the mold tube 15 is driven by a piezoceramic transducer 17. The tube 15 is filled with a gel/fiber mixture 13,14 and the surface is covered by a sponge 18 to avoid standing-wave conditions. Upon insonification by means of the piezoceramic transducer 17 the fibers 14 align in the axial direction as shown in FIG. 4.

Figure 5:
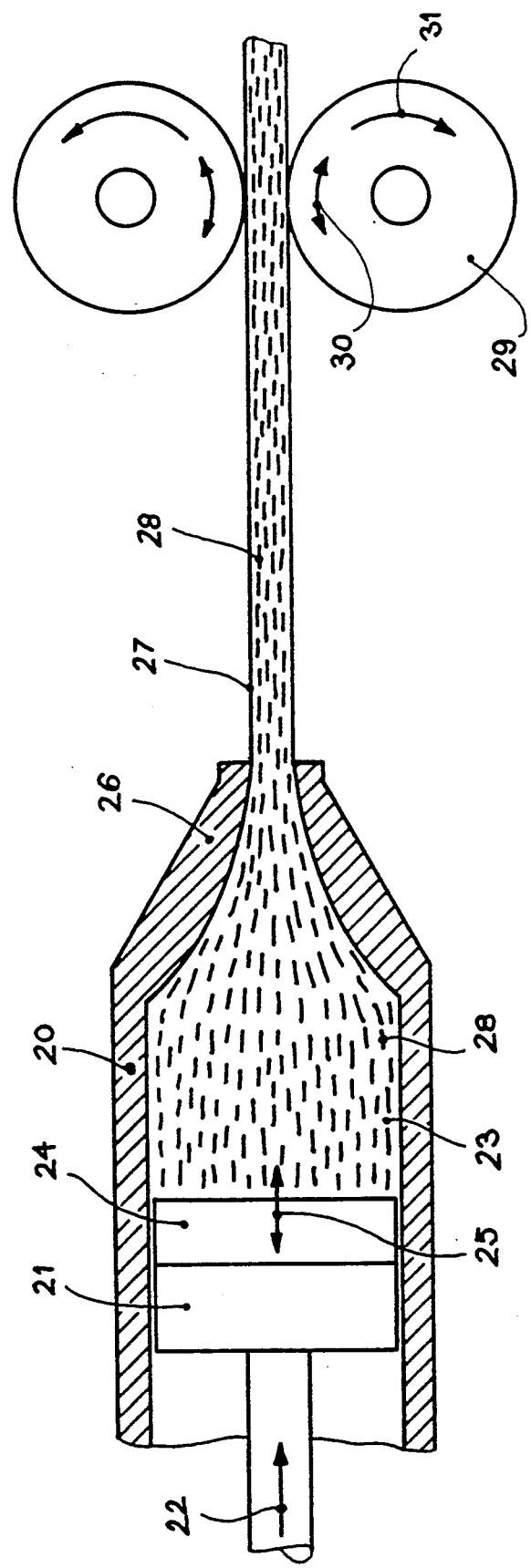
FIG. 5 is a schematic representation of an extruder for carrying out the method according to the invention.

FIG. 5 shows an extruder 20 with a piston 21. Superimposed on the axial force 22 used to extrude the mixture 23, an electro-mechanical transducer 24 generates axial waves 25 in the mixture 23. Reinforcing fibers 28 will get oriented along the extruder axis even within the cylinder 20. And further, as the extrudate 27 leaves the nozzle 26, which is shaped to amplify the wave amplitude, axial waves will travel a certain distance along its length before being dissipated. Short fibers 28 within the extrudate will be fully oriented axially, provided the extrudate 27 is in gel-like state. Axial vibrations can be further facilitated by the use of take-up rollers 29 imparting —synchronized with waves 25—axial vibrations 30 in addition to pull 31. The process results in axially oriented reinforcing fibers over the full cross-section of extrusion profiles of any dimension.

Preferred gels for the use in the above described procedure according to the invention are polymer/monomer dispersions which occur at the late stages of monomer-to-polymer conversion when entangled polymer chains form a network dispersed in the monomer (or oligomer) liquid. Orientation of the reinforcing fibers is carried out at the appropriate phase of the polymerisation, which may be slowed down if necessary and is then allowed to proceed to completion. Such a system is exemplified by methylmethacrylate polymerisation by free radicals. Transition from the gel to solid phase of the matrix may be carried out in closed forms (molds)—a major advantage when considering complex geometries.

Thermoset resins, such as epoxies and polyesters, can also be used in the transient gel state of the polymerisation/cross-linking process. Dynamics of gelling process can be additionally controlled by addition of a suitable solvent to the monomer.

Another way to prepare commonly used polymers for the reinforcement according to the invention is to dissolve them in high concentrations with suitable solvents. Again, the polymer chains need to form only an entangled network. Some examples with common polymers/solvents are listed below:

polyvinyl chloride/tetrahydrofuran, cyclohexanon or dichlorethylene;
polysulfone/chloroform or toluol;
polyphenylene oxide/chloroform, toluol or methylenchloride;
polyphenylene sulfide/chloroform, toluol or methylenchloride;
polycarbonate/chloroform or methylenchloride;
Polymethylmethacrylate/xylol, chloroform, methylenchloride or trichloroethylene;
polyurethane/methylenchloride, chloroform, tetrahydrofuran, pyrrolidone, dimethylformamide, dimethylacetamide;
polyvinyl alcohol/water with ethylene glycol, tetrahydrofuran or phenol;
polylactic acid/chloroform, methylenchloride, acetone, methylacetate;
gelatine/water;

Again, gel properties can be further controlled by addition of a non-solvent miscible with the solvent. In order to solidify these gels the solvent must be removed. This requires at least partially open molds, and restricts the thickness of the products to allow for solvent evaporation. The technique is best suited to shell manufacture.

Yet another possibility is to post-orient the fibers by swelling of the randomly fiber reinforced matrix. In case of a cross-linked matrix swelling can be done by a fluid, e.g. silicone rubber can be swollen by toluol or segmented polyurethanes by ethanol to form a (xero)-gel. The reinforcing fibers can then be oriented and the solvent removed. To effectively swell a polymer which is not cross-linked, saturated vapours of a solvent can be used at a given pressure (temperature) avoiding the loss of shape of the product yet producing a gel-like state of the polymer.

All commonly used discontinuous fibers are suitable for the reinforcement according to the invention as long as they can be considered relatively (to the gel network) stiff elements, e.g. chopped fibers of carbon, glass or aramids. Vapour grown (over hollow carbon filaments) short fibers of carbon are particularly well suited. With the gel network of the molecular size, even whisker size reinforcing elements can be oriented. Thus metal or ceramic whiskers can also be used for composite materials according to the invention.

Another, different in nature, matrix can provide the elastic response needed to orient discontinuous fibers - foam. As has been demonstrated, the elastic response of the matrix is a necessary condition for the orientation of the fibers along the fiber trajectories. Foam generates such an elastic response due to both: the surface tension and the gas pressure within the foam chambers. Thus fibers moving through a foam (as long as their length is a few times the average foam chamber diameter) will be subjected to the same forces described in connection with FIG. 2.

Commonly produced, e.g. polyurethane or polystyrene, or any other type of foams can be reinforced by oriented fibers. Sound waves are not suitable for driving the movement of the fibers, but due to lower resistance to fiber movement, the weight of the fibers is sufficient (and can be increased by gentle centrifuging) to move them through the foam.

I claim:

1. A method for producing composite material with oriented, reinforcing, discontinuous fibers comprising the following steps:
    A) providing a plurality of elongated discontinuous fibers having a predetermined length;
    B) providing a gel-like matrix substance having a network structure with openings having average dimensions inferior to the length of the fibers;
    C) mixing the fibers with the matrix substance;
    D) applying vibrational energy to the mixture to induce the fibers to elastically deform and pierce the network structure causing movement of the fibers through the openings in the network structure in a direction of wanted fiber orientation to orient the fibers substantially parallel with each other; and
    E) after orienting the fibers, solidifying the gel-like matrix.

2. A method for producing composite material with oriented, reinforcing, discontinuous fibers comprising the following steps:
    A) providing a plurality of elongated discontinuous fibers having a predetermined length;
    B) providing a gel-like matrix substance having a network structure with openings having average dimensions inferior to the length of the fibers;
    C) mixing the fibers with the matrix substance;
    D) solidifying the gel-like matrix, producing thereby an intermediate reinforced composite material with randomly oriented fibers;
    E) swelling the solidified matrix of the intermediate composite material with a suitable solvent or saturated solvent vapors into a gel-like state;
    F) applying energy to the gel-like mixture to induce translational movement of the fibers relative to the swollen matrix in a direction of wanted fiber orientation to orient the fibers in substantially parallel relationship; and
    G) after substantial parallel orientation of the fibers, solidifying the swollen gel-like matrix by removal of the solvent.

3. A method according to claim 2 wherein the length of the fibers corresponds to at least ten times the average dimensions of the openings of the network structure.

4. A method according to claim 3 wherein the energy comprises sound waves having a frequency of between about 10 Hz and about 20 MHz.

5. A method according to claim 4 wherein the sound waves have an asymmetrical wave shape.

6. A method for producing composite material with oriented, reinforcing, discontinuous fibers comprising the following steps:

A) providing a plurality of elongated discontinuous fibers having a predetermined length and a predetermined specific weight;
B) providing a gel-like matrix substance having a network structure with openings having average dimensions inferior to the length of the fibers and having a specific weight different from the specific weight of the fibers;
C) mixing the fibers with the gel-like matrix substance;
D) solidifying the gel-like matrix, producing thereby an intermediate reinforced composite material with randomly oriented fibers therein;
E) swelling the solidified matrix of the intermediate composite material with a suitable solvent or saturated solvent vapors into a gel-like state;
F) applying energy to the gel-like mixture to induce relative movement between the fibers and the network structure because of the difference in the specific weight of the fibers and the gel-like matrix to orient the fibers in substantially parallel relationship with each other; and
G) after parallel orientation, solidifying the swollen gel-like matrix by removal of the solvent.

7. A method according to claim 6 wherein, in the step of mixing, the gel-like matrix is a dispersion of entangled or cross-linked polymer in the monomer or oligomer from which the polymer is formed, whereby the polymer is at a transient state of monomer-to-polymer or oligomer-to-polymer conversion.

8. A method according to claim 6 wherein, in the step of mixing, the gel-like matrix is a dispersion of entangled polymer in an appropriate solvent.

9. A method according to claim 8 wherein said solvent is supplemented with a miscible non-solvent.

10. A method according to claim 9, wherein said fibers are chopped fibers, vapor-grown fibers or whiskers.

11. A method for producing composite material with oriented, reinforcing, discontinuous fibers comprising the following steps:
A) providing a plurality of elongated discontinuous fibers having a predetermined length;
B) providing a liquid foam-making substance;
C) mixing the fibers with the foam-making substance;
D) generating foam from the liquid foam-making substance with foam compartments having an average size inferior to the length of the fibers;
E) after generating the foam, applying energy to the foam to induce the fibers to elastically deform and pierce the foam compartments causing movement of the fibers through the foam and to thereby orient the fibers in substantially parallel relationship; and
F) after parallel orientation of the fibers, solidifying the foam.

12. A method according to claim 11, wherein said liquid foam-making substance is a monomeric or a polymeric substance.

13. Method according to claim 3, wherein said translational movement is induced by the difference in the specific weight of said fibers and said gel-like matrix.

14. A method according to claim 4 wherein the energy comprises sound waves having a frequency of between about 20 kHz and about 1 MHz.

15. A method according to claim 5 wherein the asymmetrical sound waves have a sawtooth wave shape.

16. A method for producing composite material with oriented, reinforcing, discontinuous fibers comprising the following steps:
A) providing a plurality of elongated discontinuous fibers having a predetermined length and a predetermined specific weight;
B) providing a gel-like matrix substance having a network structure with openings having average dimensions inferior to the length of the fibers;
C) mixing the fibers with the matrix substance;
D) applying vibrational energy to the mixture to induce the fibers to elastically deform and pierce the network structure causing movement of the fibers through the openings in the network structure in a direction of wanted fiber orientation to orient the fibers substantially parallel with each other; and
E) after orienting the fibers, solidifying the gel-like matrix.

17. A method according to claim 16 wherein, in the step of mixing, the gel-like matrix is a dispersion of entangled or cross-linked polymer in the monomer or oligomer from which the polymer is formed, whereby the polymer is at a transient state of monomer-to-polymer or oligomer-to-polymer conversion.

18. A method according to claim 16 wherein, in the step of mixing, the gel-like matrix is a dispersion of entangled polymer in an appropriate solvent.

19. A method for producing composite material with oriented, reinforcing, discontinuous fibers comprising the following steps:
A) providing a plurality of elongated discontinuous fibers having a predetermined length;
B) providing a gel-like matrix substance having a network structure with openings having average dimensions inferior to the length of the fibers and being a dispersion of entangled polymer in an appropriate solvent;
C) mixing the fibers with the gel-like matrix substance;
D) applying vibrational energy to the mixture to induce the fibers to elastically deform and pierce the network structure causing movement of the fibers through the openings in the network structure in a direction of wanted fiber orientation to orient the fibers substantially parallel with each other; and
E) after orienting the fibers, solidifying the gel-like matrix.

20. A method according to claim 19, wherein said solvent is supplemented with a miscible non-solvent which is solidifiable.

* * * * *